(12) United States Patent
Cisternino et al.

(10) Patent No.: US 6,323,991 B2
(45) Date of Patent: Nov. 27, 2001

(54) OPTO-ELECTRONIC FREQUENCY DIVIDER CIRCUIT AND METHOD OF OPERATING SAME

(75) Inventors: Francesco Cisternino; Andrea De Marchi, both of Turin; Raffaele Girardi, Mondovi; Stefania Roemisch, Borgaretto, all of (IT)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/766,683

(22) Filed: Jan. 17, 2001

Related U.S. Application Data

(63) Continuation of application No. 09/199,144, filed on Nov. 24, 1998, now Pat. No. 6,204,956.

(30) Foreign Application Priority Data

Dec. 16, 1997 (IT) ............................................. TO97A1097

(51) Int. Cl.[7] ........................................................ G02F 1/35
(52) U.S. Cl. ........................ 359/329; 359/135; 359/238; 359/328
(58) Field of Search ..................... 385/1–3; 359/326–332, 359/238, 239, 279, 123, 135–140

(56) References Cited

U.S. PATENT DOCUMENTS

| | | | |
|---|---|---|---|
| 5,532,857 | * 7/1996 | Gertel et al. ........................... | 359/154 |
| 5,532,867 | * 7/1996 | Hayes et al. ........................... | 359/329 |
| 6,137,610 | * 10/2000 | Patrick .................................. | 359/158 |
| 6,204,956 | * 3/2001 | Cisternino et al. .................... | 359/328 |

FOREIGN PATENT DOCUMENTS

| | | | |
|---|---|---|---|
| 9-102776 | * 4/1997 | (JP) . | |
| 5-323245 | * 12/1993 | (JP) .................................... | 359/245 |

* cited by examiner

*Primary Examiner*—John D. Lee
(74) *Attorney, Agent, or Firm*—Herbert Dubno

(57) ABSTRACT

The circuit includes an electro-optical mixer, such as an electro-optical Mach-Zehnder modulator, with non-linear behavior. The modulator receives as input an optical signal ($P_{in}$) at the frequency to be divided, in addition to an electric signal ($e_3$) at a given frequency, usually corresponding to the frequency deriving from such division. The output optical signal ($P_{out}$) from modulator exhibits a modulation spectrum containing the frequency difference between the frequency to be divided and at least one harmonic of the frequency of the above electric signal. After having been converted into an electric signal ($e_1$), the output signal of the mixer is subjected to a filtering action to extract the above frequency difference component. This latter one is then used both as electrical signal ($e_3$) for the mixing, and as output signal from the divider ($e_2$). The preferred application is to OTDM systems, to extract a synchronism signal as tributary signal frequency.

12 Claims, 3 Drawing Sheets

OPTO-ELECTRONIC FREQUENCY DIVIDER CIRCUIT AND METHOD OF OPERATING SAME

CROSS REFERENCE TO RELATED APPLICATIONS

This application is a continuation of Ser. No. 09/199,144 filed Nov. 24, 1998, now U.S. Pat. No. 6,204,956.

FIELD OF THE INVENTION

The present invention refers to frequency divider circuits and, in particular, to their possible application to optical transmissions based on the so called OTDM (Optical Time Division Multiplexing) technique.

BACKGROUND OF THE INVENTION

The OTDM technique is particularly interesting in all situations where the need arises to increase the transmission capacity of an optical link and is an alternative to other solutions based on sharing the same physical carrier among multiple channels, typically by employing WDM (Wavelength Division Multiplexing) techniques, or on increasing the number of optical fibers available for the link.

This latter solution generally requires intervention on installation (such as laying of new cables and performing excavation) and does not completely exploit the extremely wide band made available by optical fibers.

The simultaneous transmission of many different channels on the same optical fiber, for example according to wavelength division multiplexing techniques, allows using low speed opto-electronic components both in the transmitter and in the receiver, while obtaining a high overall capacity on the link. Wavelength division multiplexing further allows implementing at the optical level of some network functions like channel removal and insertion, dynamic routing, link protection, with a high reduction of the processing load for the electronic part in network nodes. The major inconveniences of such method are linked to the need for selecting and stabilizing the wavelengths for transmitters and optical filters used for channels selection, to the possible inter-channel interference due to non-linear phenomena in fiber propagation (for example the phenomenon known as Four Wave Mixing) or to the spectral nonuniformity of optical amplifier gain.

In OTDM systems, many optical signals, intensity modulated according to an RZ (return to zero) code, are interleaved into a single flow by acting on the relative delay of the pulse sequences. This solution retains most of the advantages of WDM techniques related to the possible use of low speed opto-electronic components both in the transmitter and in the receiver, further avoiding the onset of some of the above-mentioned negative phenomena. A basic condition for the proper operation of an OTDM system is however that the different optical tributary flows must be well synchronized and composed of sufficiently narrow pulses in order to avoid interference among channels. Moreover, it is essential that a driving signal at tributary frequency and synchronous with the multiplexed flow is available at the demultiplexing device.

SUMMARY OF THE INVENTION

The present invention provides a solution to this latter need and, more generally, provides a particularly simple opto-electronic frequency divider circuit, adapted to operate at very high frequencies (typically with input frequencies of the order of several tens of Gbit/s) with good performance as regards the stability of frequency and phase locking between the signal resulting from the division and the input signal.

According to the invention, opto-electronic frequency divider circuit which comprises:

electro-optical mixer means with a nonlinear behavior, adapted to receive as input a first optical signal ($P_{in}$) at a frequency to be divided ($f_0$) in addition to an electric signal ($e_3$) at a given frequency ($f_1$) and to generate as output a second optical signal ($P_{out}$) whose modulation spectrum includes, due to the mixing action, the frequency corresponding to the difference between the frequency to be divided ($f_0$) and at least one harmonic of the given frequency ($f_1$) generated due to the nonlinear behavior, a feedback path comprising opto-electronic converter means to convert the second optical signal ($P_{out}$) into an electrical conversion signal ($e_1$) adapted to be sent back to the electro-optical mixer means, filtering means associated with the feedback path to extract from the spectrum the component at the difference frequency, and extracting means to derive from the feedback path as signal ($e_2$) resulting from the frequency division action, a signal at the difference frequency.

The electro-optical mixer means can include a Mach-Zehnder electro-optical modulator.

The electro-optical mixer means can be provided with a control input ($V_{bias}$) to select the order of the at least one harmonic. The electro-optical mixer means can exhibit a substantially sinusoidal transmittivity/input voltage characteristics, and in that the electro-optical mixer means are made to operate next to one of the intermediate points in the characteristics, so that the at least one harmonic is an odd-order harmonic. This harmonic can be the third harmonic of the given frequency.

The feedback path can include at least one delay element which may be an optical waveguide interposed between the electro-optical mixer means and the opto-electronic converter means. Alternatively the delay element can be a delay line operating on electrical signals and located, along the feedback path, downstream of the opto-electronic converter means. Within this feedback path, the filtering means are located downstream of the opto-electronic converter means. The feedback path can include gain control means to keep the electrical signal ($e_3$) at such a level as to ensure the nonlinear behavior of the electro-optical mixer means.

The filtering means can be connected in the feedback path, so that the component at the difference frequency is used as the electric signal ($e_3$) fed to the electro-optical mixer means.

The extracting means can be located downstream of the filtering means so that the component at the difference frequency is used as signal ($e_2$) resulting from the frequency division action.

The first optical signal ($P_{in}$) can be a signal belonging to an aggregate flow obtained by optically time division multiplexing a plurality of tributary flows, each one having a bit rate equal to the given frequency ($f_1$), and the signal ($e_2$) resulting from the frequency division action can be a signal synchronous with the tributary flows that forms a synchronism signal for demultiplexing the aggregate flow.

The invention also comprises a method of extracting from an optical signal ($P_{in}$) conveying an aggregate flow of a given number (N) of optical tributary signals interleaved according to an optical time division multiplexing scheme, a synchronism signal at the frequency ($f_1$) of the optical tributary signal. The method includes the following operations:

subjecting the optical signal ($P_{in}$) to a nonlinear electro-optical mixing operation with an electric signal ($e_3$) at the frequency ($f_1$) of the optical tributary signals in order to generate a further optical signal ($P_{out}$) having a modulation spectrum including, due to the mixing operation, a frequency corresponding to the difference between the frequency of the aggregate flow ($f_0$) and at least one harmonic of the frequency ($f_1$) of the optical tributary signals, generated due to the nonlinear behavior of the mixing operation, converting the further optical signal ($P_{out}$) into an electrical conversion signal ($e_1$) that can be used to generate the electrical signal ($e_3$) for the electro-optical mixing operation, according to a general feedback path to which a filtering operation is associated to extract from the spectrum the component at the difference frequency, the signal thereby extracted being the synchronism signal.

The method, when applied to an aggregate flow of N optical interleaved tributary signals is characterized in that the electro-optical conversion operation is performed with such a nonlinearity degree that the at least one harmonic is an (N−1)th-order harmonic. The method can include the operation of delaying propagation of at least one of the stops of:

(1) delaying propagation of the further optical signal ($P_{out}$) within the feedback path, (2) delaying propagation of the electrical conversion signal ($e_1$) within the feedback path, and (3) delaying propagation of both the further optical signal ($P_{out}$) and the electrical conversion signal ($e_1$) within the feedback path.

In the preferred but not exclusive application to an OTDM transmission system, this circuit allows performing a division of the aggregate bit rate. The practical embodiment of the frequency divider therefore does not require a technological development degree higher than the one necessary to make the transmitter and receiver of the single channel in the transmission system

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
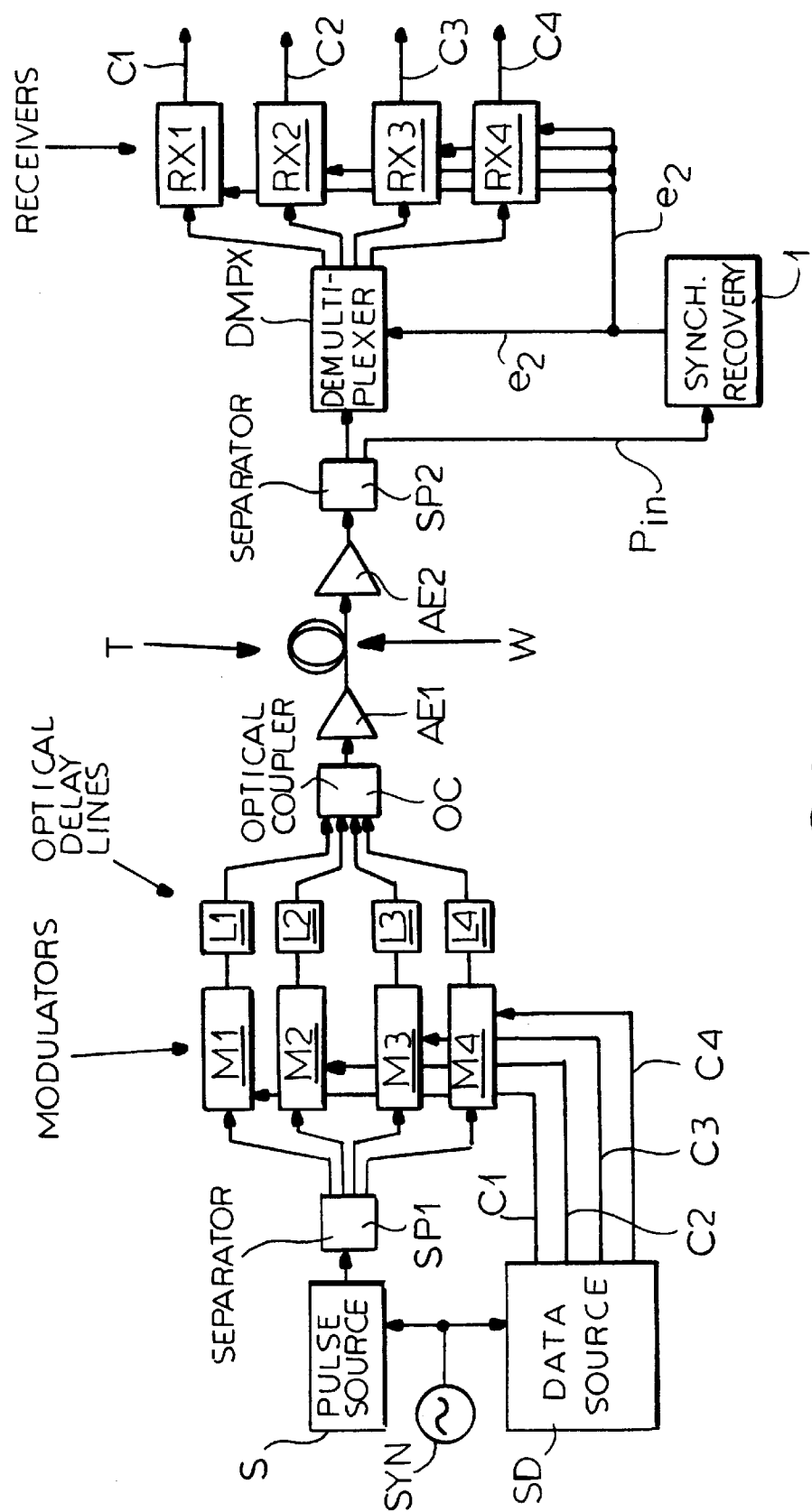
FIG. 1 shows, in block diagram form, the general arrangement of an OTDM optical transmission system to which a frequency divider circuit according to the invention can be applied.

In FIG. 1 reference T globally designates an optical link realized according to the OTDM technique.

System T, operating according to criteria known per se, allows conveying on an optical fiber line W (with associated respective amplification/realization units schematically represented by blocks AE1 and AE2) an RZ optical signal intensity modulated according to RZ (return to zero) code and having a bit rate $f_0$ equal, for example, to 40 Gbit/s.

Such optical signal is obtained by aggregating in a multiplexing unit (optical coupler) OC a number of optical signals (four in the example), defined as "tributary", each one with bit rate $f_1$ equal to 10 Gbit/s.

It is clearly apparent that reference to an aggregate flow with bit rate equal to 40 Gbit/s, obtained through multiplexing four 10 Gbit/s tributary flows, must be deemed purely as an example. Both the bit rate for tributary signals, and the number of such multiplexed signals, and—consequently—the bit rate of the resulting aggregate flow are design parameters adapted to be widely modified as a function of the specific application needs of the components being used, without departing from the scope of the present invention.

In particular, the tributary flows (hereinbelow in the present specification four tributary flows will always be referred to, as an example) are generated starting from the RZ pulse train issued by a pulse source S, typically composed of a laser source with sufficiently narrow pulses that are time-domain limited. The signal from source S is split by a separator SP1 into a plurality of replicas each fed to a respective modulator M1 to M4.

The transmitter input data, in the form of electric signals ideally coming from a data source SD synchronously driven with source S due to the common slaving to a synchronism oscillator SYN (also operating, in the disclosed embodiment, at a frequency of 10 Ghz, equal to the frequency of source S), are organized in a corresponding number of channels C1–C4, each with a bit rate of 10 Gbit/s. The signals present on channels C1–C4 drive the respective optical modulators M1—M4. The latter ones "write" the information on the related pulse trains and the signals obtained are sent to fiber W through optical coupler OC after having been mutually time-offset by a time interval At, for example in respective adjustable optical delay lines L1–L4.

The aggregate flow injected into fiber W thereby shows a typical time-domain multiplexed structure. In practice, the aggregate flow conveyed by fiber W is cyclically composed of a symbol corresponding to a datum coming from channel C1, a symbol corresponding to a datum coming from channel C2, a symbol corresponding to datum coming from channel C3, a symbol corresponding to a datum coming from channel C4, etc.

At the receiving side, the aggregate flow is sent to an optical demultiplexer DMPX that orderly extracts from the received aggregate flow the signals corresponding to the tributary channels and routes them towards corresponding receivers RX1–RX4 to recover at the output the flows corresponding to channels C1–C4.

To be able to correctly extract the different tributary signals, the demultiplexer device DMPX requires a driving signal $e_2$ (which is supplied by a synchronism recovery circuit globally designated as 1 and which is to be also sent to receivers RX1–RX4) at the tributary frequency and phase locked with the aggregate (or multiplexed) flow frequency.

When operating in RZ format, a line at the aggregate flow bit rate is always present in the multiplexed flow spectrum, while the spectral component at tributary frequency is absent (it disappears due to the multiplexing operation). In order to correctly operate, the synchronism recovery circuit must perform a division of the aggregate bit rate by a factor equal to the multiplexing factor, while keeping the phase locking between the original frequency and the divided one.

In the specific case, the signal corresponding to aggregate bit rate is extracted from the signal coming form fiber W through a component like separator SP2.

Synchronism recovery circuit 1, that is the subject matter of the present invention, is therefore a circuit that, starting from the optical signal at the aggregate frequency, is able to generate an electric signal with a frequency corresponding to the tributary signal frequency.

The circuit according to the invention ideally refers to a circuit known as a Miller frequency divider. Such divider circuit, also known as regenerative divider since it is composed of a feedback system, is characterized by very low added noise levels. It found thereby use in generating sources with high spectral purity, obtained by dividing high frequency references. For a general description of the features of such known circuit, reference can be made to the paper by R. C. Miller "Fractional-frequency Generators Utilizing Regenerative Modulation" in IV Proceedings, IRE, Vol. 27, pages 446–457, July 1939.

Similarly to the Miller divider, circuit 1 according to the invention uses a component adapted to perform a mixer function. Here a multiplication is performed between the component at the frequency corresponding to the pulse repetition rate of the signal to be divided, and the harmonics of the electrical division signal coming from the feedback loop. Such harmonics originate inside such component, designated with reference 2 and have a non-linear behavior.

Figure 3:
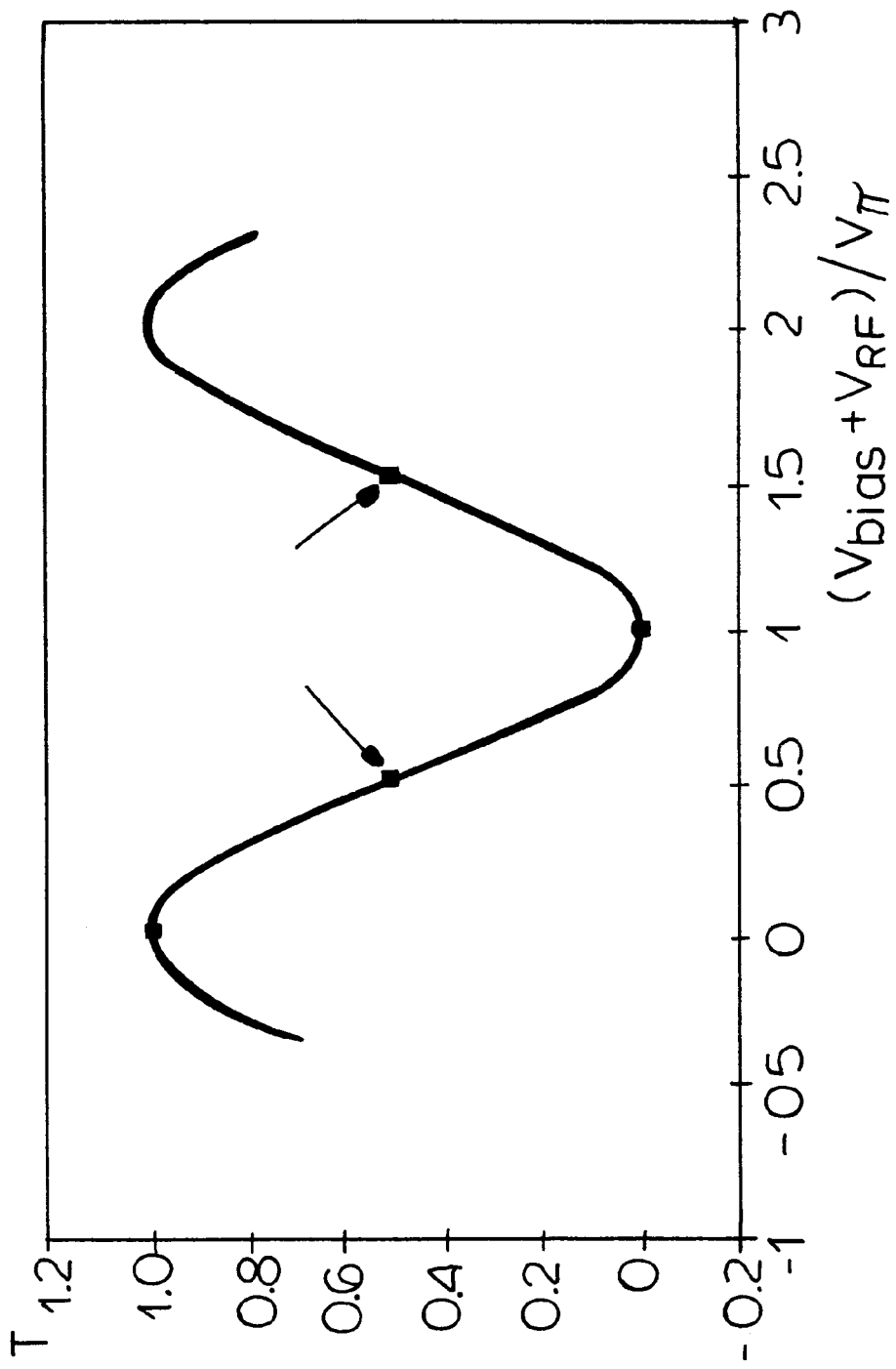
FIG. 3 is a diagram showing an operating characteristic of one of the components of the circuit in FIG. 2.

Any component showing this type of features can then be used in the invention. In the currently preferred embodiment, component 2 is an electro-optical Mach-Zehnder modulator having transmittivity characteristics as shown in the diagram in FIG. 3.

In such a diagram, the ordinate axis shows transmittivity T (normalized to unit as maximum value) versus a parameter that can be expressed as $(V_{bias}+V_{RF})/V_\pi$, and that is characteristic of the driving conditions for modulator 2.

In particular, $V_{bias}$ represents a bias voltage applied to a first driving input of modulator 2, while $V_{RF}$ is a radiofrequency driving signal applied to a corresponding input. In the specific embodiment shown in FIG. 2, the concerned radiofrequency signal is designated as $e_3$. Parameter $V_\pi$ is a normalization parameter; in practice, it is the voltage to be applied to move from maximum to minimum transmittivity. Obviously the transmittivity refers to the input/output behavior of the optical signal passing through the modulator. In the example shown, the optical input signal is represented by signal $P_{in}$ while the output signal, designated as $P_{out}$, is equal to the input signal multiplied by transmittivity. With modulator 2 it is therefore possible to perform a multiplication between the spectral components in optical input power modulation and the driving signal harmonics.

If the radiofrequency signal $V_{RF}$ is sufficiently strong sinusoidal signal, transmittivity includes components with frequencies corresponding to the frequencies of the harmonics of signal $e_3$. The relative amplitudes of such harmonics depend on the working point position on the modulator characteristics (see FIG. 3), and therefore on bias voltage $V_{bias}$ In particular, it is possible to have even harmonics only, by placing the working point next to the maximum or minimum transmittivity, or only the odd ones, by operating at the characteristics center.

In the specific embodiment shown here, it is desired to perform a frequency division by four (N=4). Therefore, the choice has been operating at the characteristics center, that is next to one of the inflexion points shown by arrows in FIG. 3, in order to generate and use the third harmonic (N−1=3) of the radiofrequency signal.

In other words, the following results are obtained:
generation (due to non-linear behavior), starting from signal $e_3$ at frequency $f_1$, of the N−1th order harmonic at frequency $(N-1)f_1$, and generation (due to the typical multiplying behavior of modulator 2) of an output signal whose frequency is equal to the difference the input signal frequencies (in addition to a signal with sum frequency).

In general, since frequency $f_0$ conveyed by input signal $P_{in}$ is N times frequency $f_1$ ($f_0=Nf_1$), the output difference signal will have the following frequency $$Nf_1-(N-1)f_1=f_1$$

this latter one being the desired frequency.

Obviously, by choosing a different working point and/or a component with different non-linear characteristics, it is possible to generate a different-order harmonic and therefore, to perform a division by a different factor. In any case it is important to note that, since harmonic generation occurs inside modulator 2, it is not necessary that the passband of radiofrequency input of modulator 2 itself should extend beyond the frequency of signal with frequency $f_1$.

Figure 2:
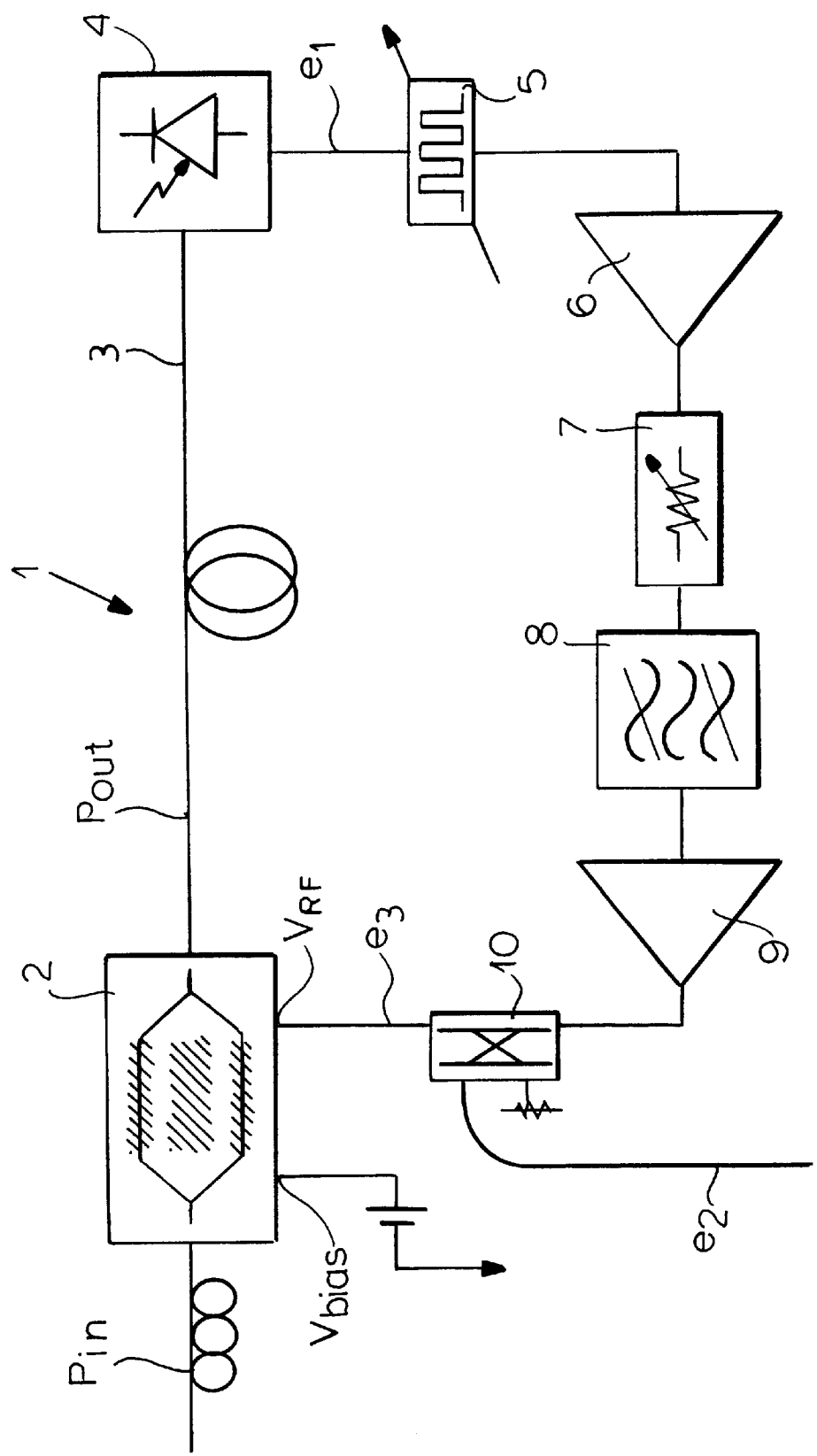
FIG. 2 shows also in block diagram form—the general structure of the divider circuit according to the invention.

In summary, in the diagram in FIG. 2, the optical input signal $P_{in}$ intensity modulated at the frequency $f_0$ to be divided (40 Gbit/s in the mentioned example) originates, through electro-optical modulator 2, optical signal $P_{out}$. This latter signal is received, possibly through a section of optical fiber 3 operating as a delay line, by a photodiode 4. In photodiode 4 the optical signal $P_{out}$ is converted into an electric signal $e_1$. After passing through a variable electric delay line 5 located downstream of photodiode 4, an amplifying stage 6 and a variable attenuator 7 (whose function will be better described below), signal $e_1$ is filtered in a pass-band filter 8 tuned around frequency $f_1$. The filtered signal thus obtained, designated as $e_3$, is sent back to input $V_{RF}$ of modulator 2, thus providing a feedback. Usually, when passing from filter 8 (also located downstream of photodiode 4 within the feedback path) to modulator 2, the signal is also made to pass through an amplitude-adjusting amplifying stage 9 and an extracting device 10, such as for example a directional coupler. The latter device extracts a fraction of the feedback signal intended to build the output signal $e_2$ for the device.

The circuit performs a phase locking between input signal $P_{in}$ and oscillating signal $e_3$ and this makes the circuit itself useful for applications like the tributary synchronism recovery device in the diagram in FIG. 1.

Experiments carried out by the Applicant have demonstrated the advantages of employing, within the general diagram in FIG. 2, some particular application embodiments. These embodiments are to be considered generally preferred, even if not mandatory per se.

In particular, the input signal $P_{in}$ is preferably injected into modulator 2 through a polarization controlling member, of a known type and not specifically shown.

The use of optical fiber 3, responsible for the majority of delays incurred by signals in the feedback path, is generally deemed preferred in order to stabilize the circuit operation, when necessary. The variable delay line 5 provided in the electrical section of the feedback loop is necessary for the fine control of the global phase shift. Preamplifier 6 and variable attenuator 7 allow accurately adjusting the circulating power.

The pass-band filter 8 does not require particular selectivity properties. Amplifier 9 is to raise signal $e_3$ supplied to input $V_{RF}$ of modulator 2 to a sufficiently high level (for example about 25 dBm) so that such signal, inside modulator 2, is subjected to the necessary distortion to produce the desired harmonic.

Obviously, without changing the principle of the invention, component parts and embodiments can be largely modified with respect to what is described and shown, without departing from the scope of the present invention.

We claim:

1. A circuit for receiving an aggregate flow of optical signals including a first optical signal ($P_{in}$) obtained by optical time division multiplexing of a plurality of tributary flows of optical signals, each having a bit rate equal to a given frequency ($f_1$), and wherein a signal ($e_2$) is produced by frequency division which is synchronous with said tributary flows and forms a synchronism signal for demultiplexing the aggregate flow, said circuit comprising:

nonlinear electro-optical mixer means receiving as an input said first optical signal ($P_{in}$) at a frequency ($f_0$) to be divided in addition to an electrical signal ($e_3$) at said given frequency ($f_1$) and to generate as an output a second optical signal ($P_{out}$) whose modulation spectrum includes, due to mixing action, a frequency corresponding to the difference between said frequency ($f_0$) to be divided and at least one harmonic of said given frequency ($f_1$) generated by nonlinear behavior of said mixer means;

a feedback path connected to said mixer means and comprising opto-electronic converter means for converting said second optical signal ($P_{out}$) into an electrical conversion signal ($e_1$) returned to said electro-optical mixer means;

filtering means along said feedback path for extracting from said spectrum the component at said difference frequency; and extracting means along said feedback path for deriving from said feedback path a signal ($e_2$) at said difference frequency and resulting from frequency division.

2. A circuit according to claim 1 wherein said electro-optical mixer means includes a Mach-Zehnder electro-optical modulator.

3. A circuit according to claim 1 wherein said electro-optical mixer means is provided with a control input ($V_{bias}$) to select an order of said at least one harmonic.

4. A circuit according to claim 1 wherein said electro-optical mixer means has substantially sinusoidal transmittivity/input voltage characteristics, and said electro-optical mixer means operate next to one of the intermediate points in said characteristics, so that said at least one harmonic is an odd-order harmonic.

5. A circuit according to claim 1 wherein said at least one harmonic is the third harmonic of said given frequency ($f_1$).

6. A circuit according to claim 1 wherein said feedback path includes at least one delay element.

7. A circuit according to claim 6 wherein said feedback path includes, as said delay element, an optical waveguide interposed between said electro-optical mixer means and said opto-electronic converter means.

8. A circuit according to claim 6 wherein said feedback path includes, as said delay element, a delay line operating on electrical signals and located, along the feedback path, downstream of said opto-electronic converter means.

9. A circuit according to claim 1 wherein within said feedback path, said filtering means is located downstream of said opto-electronic converter means.

10. A circuit according to claim 1 wherein said feedback path includes gain control means to keep said electrical signal ($e_3$) at such a level as to ensure the non-linear behavior of said electro-optical mixer means.

11. A circuit according to claim 1 wherein said filtering means are connected in said feedback path, so that said component at said difference frequency is used as said electrical signal ($e_3$) fed to said electro-optical mixer means.

12. A circuit according to claim 1 wherein said extracting means is located downstream of said filtering means, so that said component at said difference frequency is used as signal ($e_2$) resulting from the frequency division action.

* * * * *